United States Patent [19]

Sievers et al.

[11] Patent Number: 4,698,200
[45] Date of Patent: Oct. 6, 1987

[54] SELF-ACTUATED NUCLEAR REACTOR SHUTDOWN SYSTEM USING INDUCTION PUMP TO FACILITATE SENSING OF CORE COOLANT TEMPERATURE

[75] Inventors: Robert K. Sievers, N. Huntingdon; Martin H. Cooper, Churchill; Robert B. Tupper, Greensburg, all of Pa.

[73] Assignee: The United States of America as represented by the United States Department of Energy, Washington, D.C.

[21] Appl. No.: 812,045

[22] Filed: Dec. 23, 1985

[51] Int. Cl.⁴ ................................................ G21C 7/02
[52] U.S. Cl. ................................. 376/233; 376/336; 376/352; 376/335
[58] Field of Search ............... 376/336, 337, 327, 333, 376/233, 335, 352

[56] References Cited

U.S. PATENT DOCUMENTS

| | | |
|---|---|---|
| 3,951,738 | 4/1976 | George et al. |
| 4,053,359 | 10/1977 | Pennell et al. |
| 4,077,835 | 3/1978 | Bishop et al. |
| 4,138,318 | 2/1979 | Speelman |
| 4,138,320 | 2/1979 | Grantz ............................ 376/337 |
| 4,235,669 | 11/1980 | Burgess et al. |
| 4,304,632 | 12/1981 | Bhate et al. |

Primary Examiner—Harvey E. Behrend
Attorney, Agent, or Firm—F. J. Baehr, Jr.

[57] ABSTRACT

A self-actuated shutdown system incorporated into a reactivity control assembly in a nuclear reactor includes pumping means for creating an auxiliary downward flow of a portion of the heated coolant exiting from the fuel assemblies disposed adjacent to the control assembly. The shutdown system includes a hollow tubular member which extends through the outlet of the control assembly top nozzle so as to define an outer annular flow channel through the top nozzle outlet separate from an inner flow channel for primary coolant flow through the control assembly. Also, a latching mechanism is disposed in an inner duct of the control assembly and is operable for holding absorber bundles in a raised position in the control assembly and for releasing them to drop them into the core of the reactor for shutdown purposes. The latching mechanism has an inner flow passage extending between and in flow communication with the absorber bundles and the inner flow channel of the top nozzle for accommodating primary coolant flow upwardly through the control assembly. Also, an outer flow passage separate from the inner flow passage extends through the latching mechanism between and in flow communication with the inner duct and the outer flow channel of the top nozzle for accommodating inflow of a portion of the heated coolant from the adjacent fuel assemblies. The latching mechanism contains a magnetic material sensitive to temperature and operable to cause mating or latching together of the components of the latching mechanism when the temperature sensed is below a known temperature and unmating or unlatching thereof when the temperature sensed is above a given temperature. The temperature sensitive magnetic material is positioned in communication with the heated coolant flow through the outer flow passage for directly sensing the temperature thereof. Finally, the pumping means includes a jet induction pump nozzle and diffuser disposed adjacent the bottom nozzle of the control assembly and in flow communication with the inlet thereof. The pump nozzle is operable to create an upward driving flow of primary coolant through the pump diffuser and then to the absorber bundles. The upward driving flow of primary coolant, in turn, creates a suction head within the outer flow channel of the top nozzle and thereby an auxiliary downward flow of the heated coolant portion exiting from the upper end of the adjacent fuel assemblies through the outer flow channel to the pump nozzle via the outer flow passage of the latching mechanism and an annular space between the outer and inner spaced ducts of the control assembly housing. The temperature of the heated coolant exiting from the adjacent fuel assemblies can thereby be sensed directly by the temperature sensitive magnetic material in the latching mechanism.

16 Claims, 8 Drawing Figures

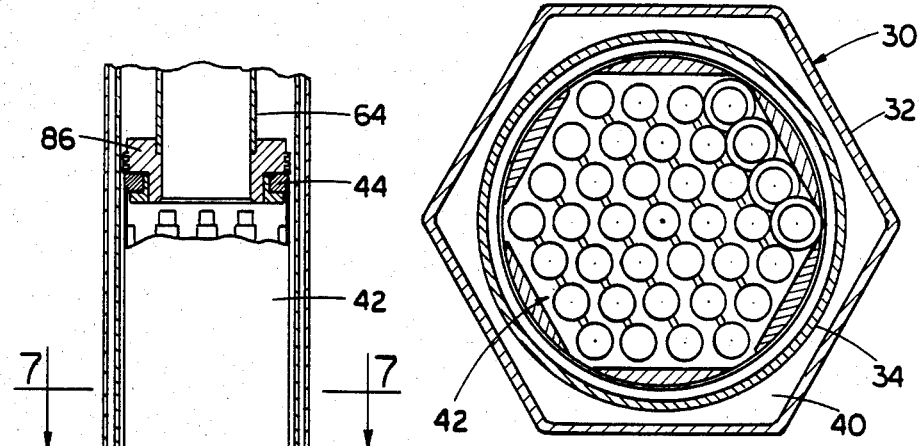
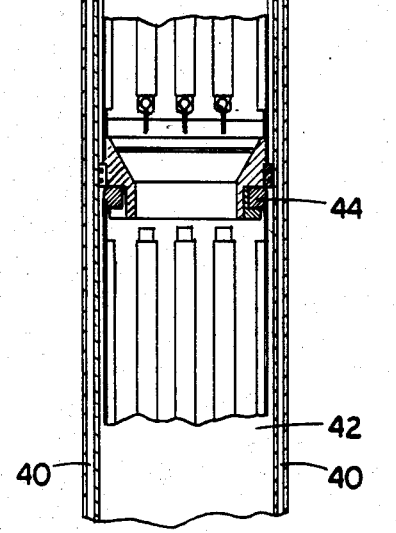
FIG. 6
FIG. 7
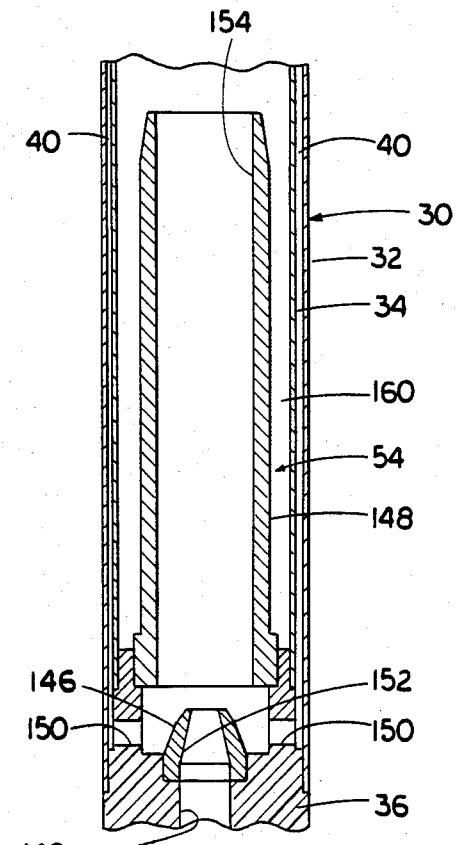
FIG. 8

SELF-ACTUATED NUCLEAR REACTOR SHUTDOWN SYSTEM USING INDUCTION PUMP TO FACILITATE SENSING OF CORE COOLANT TEMPERATURE

BACKGROUND OF THE INVENTION

1. Field of the Invention

The present invention relates generally to reactivity control systems for nuclear reactors and, more particularly, is concerned with a self-actuated nuclear reactor shutdown system employing an induction pump for drawing a portion of coolant flowing from the exit of adjacent fuel assemblies into the shutdown system so that the coolant temperature can be sensed directly.

2. Description of the Prior Art

Typically, a liquid metal reactor (LMR) has a core which contains a multiplicity of nuclear fuel rods disposed in a plurality of fuel assemblies for generating a nuclear reaction which heats a coolant flowing through the fuel assemblies. Also, the LMR includes a number of neutron absorber rods disposed in two basic types of control rod assemblies for regulating core reactivity: a primary control rod assembly and a secondary control rod assembly. The three types of assemblies, each being preferably hexagonal in cross section, are disposed adjacent to one another in a predetermined arrangement in the core.

A primary control system operates each primary control rod assembly to maintain reactor criticality by adjusting the quantity of neutron absorber or poison material (typically boron carbide) in the active core region and to effectuate shutdown in normal and abnormal operations. Typically, the absorber material (often contained in rod bundles) of each primary control assembly is reciprocated vertically within the core between several adjacent fuel assemblies to control reactivity.

A secondary control system operates each secondary control rod assembly as a backup to the primary control system shutdown function. The absorber rod bundle of each secondary control assembly, commonly referred to as a shutdown assembly, is ordinarily held in a raised position outside the core region and is only released and dropped into the core for shutdown purposes, if the primary system fails.

Generally, both types of control systems are activated manually (through operator action) or by various sensors which monitor the core conditions. In each case, external circuitry is used in the shutdown process. In order to provide another level of reactor protection, systems have been designed which eliminate the need to rely on external circuitry to sense and effect shutdown. One example of such systems is a self-actuated shutdown system for each of the secondary control assemblies as disclosed in U.S. Pat. No. 4,304,632 issued to S. K. Bhate et al and assigned to the same assignee as the present invention. This shutdown system employs a temperature sensitive magnetic latch to support the bundle of absorber rods of the respective secondary control rod assembly outside of the active core. The material that caries the magnetic flux at normal operating coolant temperatures, is designed to loose its magnetic capabilities at elevated temperatures, such as would develop during an accident event. The magnetic latch cannot support the weight of the absorber rod bundle at these elevated temperatures, and, consequently, will drop the bundle into the core if the primary and secondary control systems fail.

However, the typical absorber rod bundle generally operates at coolant temperatures significantly below the average coolant temperature of the core (the coolant temperature of the fuel assemblies being much higher than that of the control assemblies) and during a transient over-temperature event the coolant temperature response of the absorber rod bundle is much slower than the average core coolant temperature. In order to maximize the speed and reliability of the self-actuated shutdown system, the above-cited patent used a number of dedicated fuel rods installed between the inner and outer ducts in the absorber rod assembly to simulate the higher coolant temperature in adjacent fuel assemblies. This high temperature coolant was then used at the magnetic latch location to actuate the shutdown system. Specifically, the temperature sensitive component of the magnetic latch, being positioned on a fully withdrawn secondary control rod assembly, would sense the temperature of the outlet coolant of these dedicated shutdown assembly fuel rods, which would be typical of fuel assembly coolant temperatures, and respond quickly to the rising temperature of an accident event. These dedicated fuel rods also provided the flexibility to tailor the self-actuated system to a particular core design by controlling the fuel rod coolant flow.

Norwithstanding the overall satisfactory performance of the above shutdown system, several disadvantges have been found to reside in this particular design. First, the cost of manufacturing these self-actuated shutdown control assemblies is much higher than the standard control assemblies due to the added complexity of including the dedicated fuel rods. Second, the combination of fuel and absorber material in the same unit results in more costly disassembly procedures when the assembly is removed from service. Third, the use of the dedicated fuel rods and the fixed position of the temperature sensitive material requires that the shutdown assembly operate only in a fully withdrawn position and thus the assembly cannot be used as a primary control rod assembly. Finally, the dedicated fuel rods reduce the space available within the shutdown assembly for absorber material. Consequently, a need still exists for a reactivity control rod assembly which will reduce the complexity and cost and improve the flexibility of implementing a self-actuated shutdown system while retaining the benefits to be derived therefrom.

SUMMARY OF THE INVENTION

The present invention provides a self-actuated nuclear reactor shutdown system designed to satisfy the aforementioned needs. The features of the present invention greatly simplify and broaden the capabilities of the self-actuated shutdown system by eliminating the need for the dedicated fuel rods and the disadvantages associated therewith. One important feature of the present invention is the incorporation of a jet induction pump in a lower portion of the assembly to create a suction head within the assembly. This suction head draws a portion of the coolant flowing from the exit of adjacent fuel assemblies into the shutdown system so that the fuel assembly coolant temperature can be sensed directly rather than only simulated as done heretofore by use of the dedicated shutdown fuel rods. Another important feature of the present invention is the direct incorporation of temperature sensitive magnetic material into the latch itself which allows the magnetic material to move with the latch. The important advantage here is that the self-actuated system can now be used also in a primary reactivity control rod assembly. Additional features provide the assembly with increased lifting capabilities and a higher discrimination ratio (the low to high temperature holding force) because the magnetic path length/reluctance has been reduced.

Accordingly, the present invention is set forth in a nuclear reactor which includes at least one fuel assembly having an upper end from which exits coolant after flowing upwardly through and being heated within the fuel assembly and at least one reactivity control assembly disposed adjacent the fuel assembly and having a bottom nozzle with an inlet, a top nozzle with an outlet, radially spaced outer and inner elongated ducts extending between and mounted at respective upper and lower ends to the nozzles, at least one neutron absorber bundle disposed in the inner duct for movement between raised and lowered positions axially along the inner duct and a driveline for moving the absorber bundle, the ducts defining an annular space extending between the nozzles and the top nozzle outlet being disposed adjacent the upper end of the fuel assembly.

The present invention is directed to a self-actuated shutdown system incorporated in the reactivity control assembly which comprises: (a) a tubular member extending through the outlet of the top nozzle so as to define an outer annular flow channel through the top nozzle outlet between the member and the top nozzle; (b) a latching mechanism disposed between the driveline and the absorber bundle and including mating means and sensing means, the mating means being matable for interconnecting the driveline and the bundle together to hold the bundle in the raised position and unmatable for releasing the bundle from the driveline to drop the bundle to the lowered position, the mating means also defining an outer flow passage extending between and in flow communication with the inner duct and the outer flow channel of the top nozzle, the sensing means being sensitive to temperature and cooperable with the mating means for causing mating thereof when the temperature sensed is below a known temperature and unmating thereof when the temperature sensed is above a given temperature, the sensing means being positioned in communication with the outer flow passage of the mating means; (c) orifice means defining at least one flow opening through the inner duct above the absorber bundle so as to establish flow communication between the inner duct and the annular space between the inner and outer ducts; and (d) pumping means disposed adjacent the bottom nozzle and in flow communication with the inlet thereof and the inner duct below the absorber bundle, the pumping means being operable to receive primary coolant flow from the bottom nozzle inlet and create an upward driving flow of the primary coolant through the absorber bundle, the pumping means establishing flow communication between the absorber bundle and the annular space at the inner duct lower end such that the upward driving flow of primary coolant, in turn, creates a suction head within the outer flow channel of the top nozzle and thereby an auxiliary downward flow of a portion of the heated coolant exiting from the upper end of said adjacent fuel assembly through the outer flow channel to the pumping means via the outer flow passage of the latching mechanism, the opening of the orifice means through the inner duct and the annular space between the ducts such that the temperature of the heated coolant exiting from the upper end of the adjacent fuel assembly can be sensed directly by the temperature sensitive sensing means of the latching mechanism.

More particularly, the mating means of the latching mechanism includes a lower cylindrical socket interconnected to the absorber bundle and having an upwardly-facing central mating surface and a peripheral edge, an upper socket interconnected to the driveline and including a peripheral ledge having a downwardly-facing outer annular mating surface and a downwardly-extending central cylindrical body portion having a downwardly-facing central mating surface, an annular-shaped electromagnet coil mounted about the central body portion of the upper socket, and an annular-shaped armature connected to and extending upwardly from the peripheral edge of the lower socket and radially spaced outwardly from the coil, the armature having an upwardly-facing annular mating surface, whereby when the mating means is mated together the central mating surfaces of the upper and lower sockets contact one another and the annular mating surfaces of the upper socket and armature contact one another. Further, the armature of the mating means includes upper and lower annular portions, and the sensing means of the latching mechanism is in the form of an annular ring of temperature sensitive magnetic material being mounted between and interconnecting the upper and lower portions of the armature. Also, the mating means further includes a cylindrical insulating sleeve disposed within the armature, with the upper and lower annular portions of the armature having upper and lower inwardly-directed ledges connected to the sleeve and respective orifices defined therethrough between the respective ledges and the annular ring of temperature sensitive magnetic material so as to define an inner branch of the outer flow passage in flow communication with an interior side of the annular ring of temperature sensitive magnetic material. The annular ring of temperature sensitive magnetic material is spaced radially inwardly at an exterior side thereof from the inner duct so as to define an outer branch of the outer flow passage in flow communication with the exterior side.

Still further, the pumping means of the shutdown system includes a jet pump nozzle attached to the bottom nozzle in flow communication with the inlet thereof and the inner duct and having an upwardly converging orifice for receiving primary coolant flow from the bottom nozzle inlet and creating a high velocity upward driving flow of the primary coolant. Also, the pumping means includes a jet pump diffuser attached to the bottom nozzle and disposed in spaced relation above the jet pump nozzle, the pump diffuser having an upwardly diverging orifice for receiving the upward driving flow of the primary coolant from the pump nozzle and distributing the flow to the absorber bundle. The pumping means further includes at least one passageway defined through the bottom nozzle between the lower jet pump nozzle and the upper jet pump diffuser so as to provide flow communication from the annular space between the outer and inner ducts to the bottom nozzle inlet such that the upwardly driving flow of the primary coolant from the pump nozzle creates the suction head in the outer flow channel of the top nozzle via the outer flow passage of the latching mechanism and the annular space. The passageway extends radially from the bottom nozzle inlet to the annular space at the lower end of the inner duct.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is another enlarged vertical crosssectional view, in foreshortened form and on a somewhat larger scale, of the middle portion of the primary reactivity control assembly employing the present invention being removed from the LMR and similar to that of FIG. 2, but illustrating some of the portions of the assembly omitted from FIG. 2.

FIG. 7 is an enlarged horizontal crosssectional view taken along line 7—7 of FIG. 6, showing the arrangement of the absorber rods comprising each one of the bundles thereof.

FIG. 8 is a vertical cross-sectional view, on a somewhat larger scale, of the lower portion of the primary reactivity control assembly of FIG. 2.

DETAILED DESCRIPTION OF THE INVENTION

Figure 1:
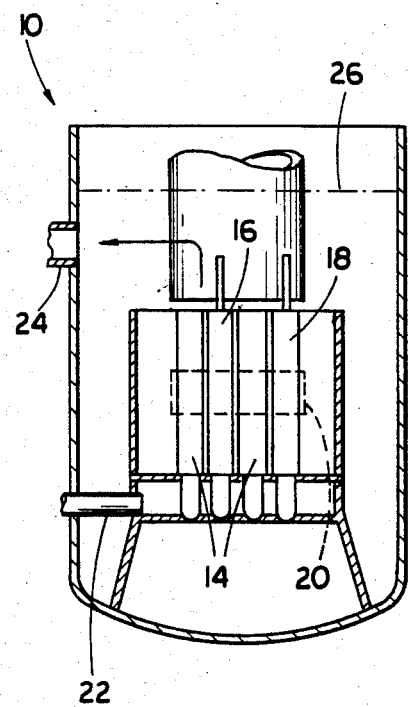
FIG. 1 is a simplified schematical view, partly in section, of the lower portion of a typical LMR in which the self-actuated shutdown system of the present invention can be employed.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown the lower portion of a typical LMR, being generally designated by the numeral 10. The reactor 10 includes a vessel 12 housing a plurality of assemblies which include fuel assemblies 14, primary control assemblies 16, and secondary control or shutdown assemblies 18. Fissionable fuel is contained in fuel assemblies in a core region 20 being represented by the dashed line rectangular box. A coolant, for example liquid sodium, enters the vessel 12 through a lower inlet 22, flows upwardly through the various assemblies 14,16,18 absorbing heat energy, and is discharged from the vessel through an upper outlet 24 to heat transfer apparatus (not shown) of the LMR typically for the ultimate purpose of electric power generation. The coolant fills the vessel 12 to a level indicated by dashed line 26 located above the upper outlet 24.

The reactor power output can be controlled in several fashions, including variation of coolant flow rate, selective positioning of portions of the primary control assemblies 16 containing neutron absorbing material, such as boron carbide, and full in core or full out of core positioning of the portion of the shutdown assemblies 18 which contain neutron absorber material also.

Figure 2:
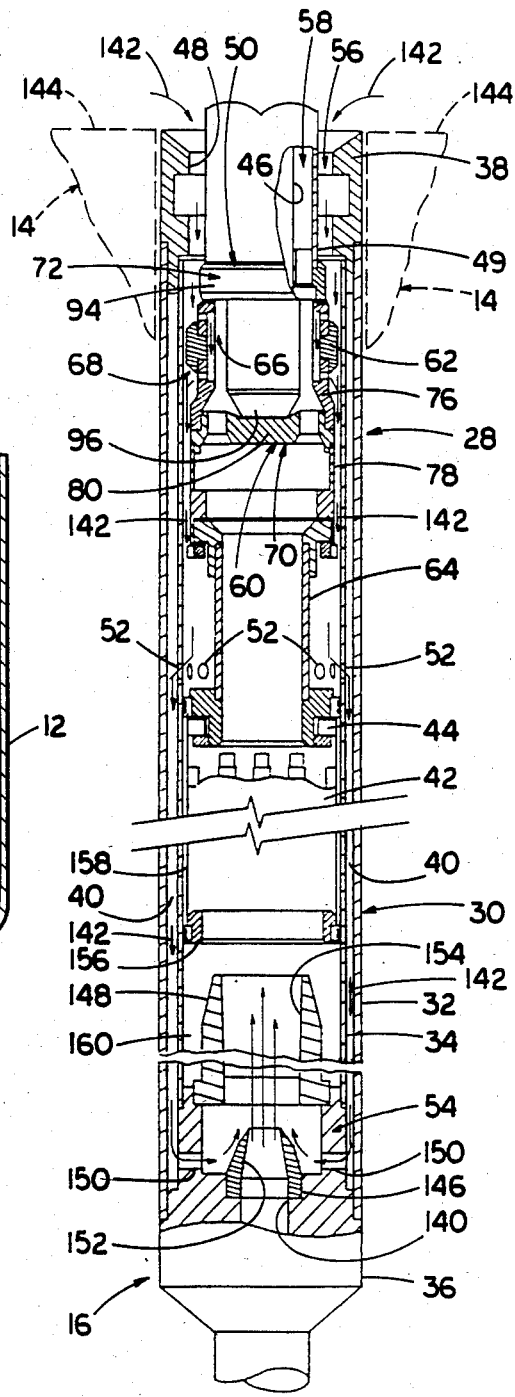
FIG. 2 is an enlarged vertical cross-sectional view, in foreshortened form, of one of the primary reactivity control assemblies employing the self-actuated shutdown system of the present invention being removed from the LMR.

In FIG. 2, one of the primary reactivity control assemblies 16 which each incorporates the improved self-actuated shutdown system of the present invention, generally designated by the numeral 28, is shown removed from the LMR 10. Although the shutdown system 28 is illustrated in conjunction with a primary control assembly 16, it is equally applicable for use in each of the secondary control or shutdown assemblies 18.

Figure 4:
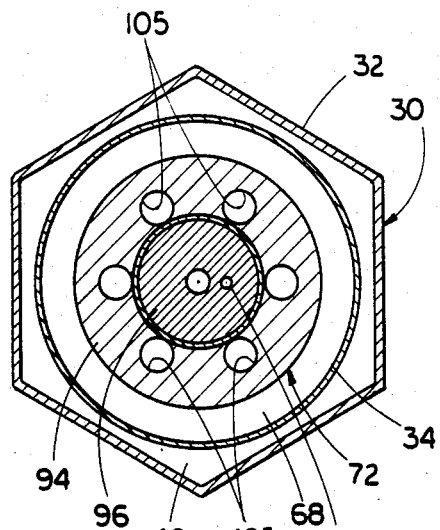
FIG. 4 is a horizontal cross-sectional view taken along line 4—4 of FIG. 3 on a slightly larger scale than that in FIG. 3, showing the cross-sectional configuration of an upper socket of the latching mechanism of the shutdown system and the symmetrical pattern of a plurality of coolant flow holes therethrough.
Figure 5:
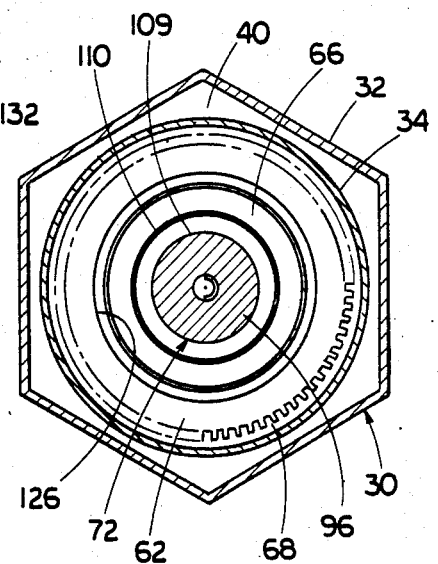
FIG. 5 is another horizontal cross-sectional view taken along line 5—5 of FIG. 3 on a slightly larger scale than that in FIG. 3, showing the crosssectional configuration of a temperature sensitive magnetic material of the latching mechanism of the shutdown system and the cross-sectional configuration of an electromagnetic coil attached on the upper socket of the latching mechsnism.

The primary reactivity control assembly 16 includes an elongated housing 30 stationarily mounted in the core region 20 and having radially spaced outer and inner ducts 32,34 mounted between bottom and top nozzles 36,38 and defining an annular space 40 therebetween. As seen in FIGS. 4, 5 and 7, preferably, the outer duct 32 has a hexagonal cross-sectional configuration, whereas the inner duct 34 is cylindrical shaped in cross section. However, it is to be understood that the general configuration of the housing 30 and other components herein described can easily be varied in accordance with any specific configuration of the core region 20. The outer duct 32 extends through the core region 20 and is typically bounded radially by fuel assemblies 14 containing conventional fissionable fuel rods (not shown).

The primary control assembly 16 also includes a plurality of neutron absorber rod bundles 42 (see also FIG. 6) housed in the inner duct 34 and interconnected in a tandem relationship by articulated joints 44 (only one being seen in FIG. 6). The uppermost one of the bundles 42 is interconnected to a driveline shaft 46 which is reciprocally movable by a suitable drive mechanism (not shown) through an outlet 48 in the top nozzle 38 so as to selectively dispose the bundles 42 between lowered and raised positions (only the raised position being illustrated in FIGS. 2 and 3) axially along the inner duct 34 and relative to the adjacent fuel assemblies 14 within the core region 20 to control the reactivity thereof during normal LMR operation.

Improved Self-Actuated Shutdown System

The primary reactivity control assembly 16 also incorporates the improved self-actuated shutdown system 28 of the present invention which adapts it to automatically effect shutdown of the LMR 10 in the event an abnormal operating condition arises within the core region 20. The shutdown system 28, as seen in FIGS. 2 to 8, basically includes a hollow tubular collar or member 49, a latching mechanism 50, an orifice means 52 and a pumping means 54. The hollow tubular member 49 extends through the outlet 48 of the top nozzle 38 in radially inward spaced relation thereto so as to define an outer annular flow channel 56 extending through the top nozzle outlet 48 between the exterior of the hollow member 49 and the top nozzle 38. The tubular member 49, being hollow, also defines an inner flow channel 58 separate from the outer flow channel 56 and extending through the top nozzle 38 but within the interior of the hollow member 49.

Figure 3:
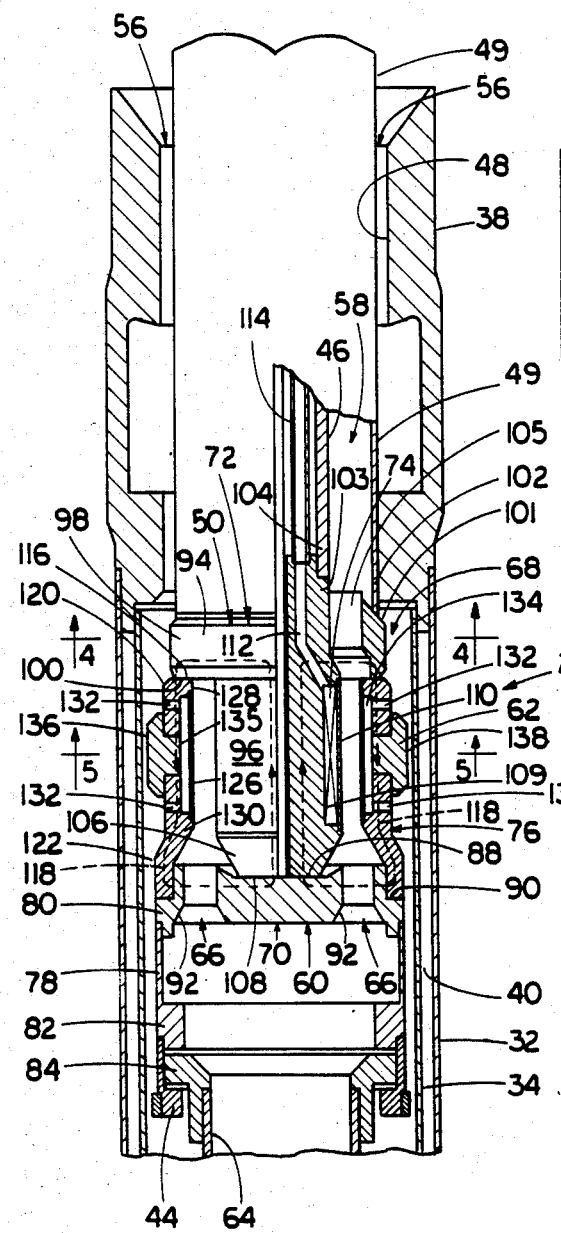
FIG. 3 is an enlarged fragmentary view of an upper portion of the primary reactivity control assembly of FIG. 2.

The latching mechanism 50 of the shutdown system 28 is generally disposed in the inner duct 34 adjacent the upper end thereof and between the tubular member 49 and the uppermost absorber bundle 42. The latching mechanism 50 basically includes a mating means, generally indicated at 60, and a sensing means 62. The mating means 60 when mated interconnects the driveline shaft 46 and the upper most absorber bundle 42 together via an elongated extension sleeve 64 so as to allow the absorber bundles 42 to be held by the shaft 46 in their raised position (as seen in FIGS. 2 and 3) in which all bundles are withdrawn from the core region 20 or in some other selected position in which only some of the bundles are withdrawn from the core region 20. On the other hand, the mating means 60 when unmated releases the bundles 42 from the driveline shaft 46 so as to drop the bundles to their lowered position in which they are fully inserted in the core region 20.

In addition to the above-described absorber bundle handling functions, the mating means 60 also defines an inner flow passage, generally designated by the numeral 66, which extends and provides flow communication between the inner flow channel 58 of the top nozzle 38 and the absorber bundles 42 via the interior of the extension sleeve 64. Additionally, in conjunction with the inner duct 34, the mating means 60 also defines an outer flow passage 68 separate from the inner flow passage 66 and extending in flow communication between the inner duct 34 and the outer flow channel 56 of the top nozzle 38.

More specifically, the latching mechanism mating means 60 includes a lower socket 70, an upper socket 72, an electromagnetic coil 74, and an armature 76. The lower socket 70 is composed of an annular side wall 78 and upper end wall 80 attached to the side wall. The side wall 78 is connected at its lower end 82 by an articulated joint 44 to the upper end 84 of the extension sleeve 64 which, in turn, is connected at its lower end 86 via another articulated joint 44 to the uppermost one of the absorber bundles 42. The upper end wall 80 has an upwardly-facing central recessed mating surface 88, a outer peripheral recessed edge 90 and a plurality of openings 92 defined therethrough between the mating surface 88 and the outer edge 90. The openings 92 provide flow communication of the inner flow passage 66 of the mating means 60 with the absorber bundles 42 via the interior of the extension sleeve 64.

The upper socket 72 of the latching mechanism mating means 60 is composed of a upper cylindrical head 94 and a central cylindrical body 96 attached to and extending downwardly from the head. The socket body 96 has a smaller diameter than that of the upper head 94 so as to define a peripheral ledge 98 on the head 94 which extends radially outward from the body 96 and has a downwardly-facing outer annular mating surface 100 formed thereon. The head 96 at an upper recessed peripheral edge 101 on its ledge 98 is attached to a lower end 102 of the tubular member 49 and at its central upwardly protruding stem 103 is attached to a lower end 104 of the driveline shaft 46. The head 96 also has a plurality of holes 105 (seen best in FIG. 4) defined therethrough between the mating surface 100 and the central body 92 (or upper protruding stem 103) in a pattern which matches that of the openings 92 in the lower socket end wall 80. The holes 105 provide flow communication of the inner flow passage 66 of the mating means 60 with the inner flow channel 58 of the top nozzle 38 within the interior of the tubular member 49. Additionally, the body 96 at a lower end 106 has a downwardly-facing central mating surface 108 formed thereon.

The electromagnetic coil 74 of the latching mechanism mating means 60 is annular shaped and mounted about the central body 96 of the upper socket 72 within an annular recessed portion 109 formed therein. The coil 74 is hermetically sealed by a cylindrical sleeve 110 surrounding the coil and attached to the central body 96. Lead wires (not shown) for supplying electrical power to the coil 74 are enclosed in a passageway 112 formed in the upper socket 72 and in a conduit 114 which is connected to the passageway 112 and contained within the driveline shaft 46.

Finally, the armature 76 of the latching mechanism mating means 60 is also annular shaped and radially spaced outwardly from the central body 96 of the upper socket 72 and the coil 74 mounted thereon. When the components of the mating means 60 are mated together as seen in FIGS. 2 and 3, the annular region between the armture 76 and the central body 96 forms the inner flow passage 66 of the mating means 60 which communicates with the inner flow channel 58 of the top nozzle 38 and with the absorber bundles 42 (via the interior of the extension sleeve 64) respectively through the holes 105 in the upper socket head 94 and the openings 92 in the lower socket end wall 80. In addition, the armature 76 is connected to and extends upwardly from the outer peripheral recessed edge 90 on the upper end wall 80 of the lower socket 70. At its upper end, the armature 76 has an upwardly-facing annular mating surface 116. Therefore, when the components of the mating means 60 are mated together, the central mating surfaces 88,108 of lower and upper sockets 70,72 contact one another and the annular mating surfaces 100,116 of the upper socket 72 and the armature 76 contact one another. The lower and upper sockets 70,72 and the armature 76 are made of ferromagnetic material and the mating surfaces 88,108 and 100,116 are sized to allow transference thereacross of a preselected magnetic flux produced in these components of the mating means 60, together with the sensing means 60 to be described, when the electromagnetic coil 74 is energized to create the magnetic holding flux represented by the dashed paths 118 in FIG. 3.

The sensing means 62 of the latching mechanism 50, as in the referenced patent, is a Curie temperature material selected to provide a holding magnetic permeability up to a preselected temperature, for example, up to 1022 degrees F., and to loose its permeability and magnetic holding capacity above a preselected temperature, for example at 1050 degrees F. Curie temperature materials which exhibit such properties are well known, such as those comprised of nickel-iron alloys.

Thus, the sensing means 62 being sensitive to temperature is cooperable with the mating means 60 for causing mating thereof when the temperature sensed is below a preselected or known temperature an unmating thereof when the temperature sensed is above a preselected or given temperature. Specifically, the armature 76 of the mating means 60 includes upper and lower annular portions 120,122. The sensing means 62 is in the form of an annular ring of Curie temperative sensitive magnetic material which is mounted between and rigidly interconnects the upper and lower portions 120,122 of the armature 76 so as to form an integral part thereof.

The temperature sensitive annular ring 62 is positioned in communication with the outer flow passage 68 of the mating means 60 so as to maximize contact of its surface area with heated coolant flowing through the passage 68. A cylindrical insulating sleeve 126 is disposed within the armature 76. The upper and lower annular portions 120,122 of the armature 76 have upper and lower inwardly-directed ledges 128,130 to which the insulating sleeve 126 is affixed and respective orifices 132 defined therethrough between the respective ledges 128,130 and the annular ring 62 of temperature sensitive magnetic material. The orifices 132 and the space between the sleeve 126 on the one side and the armature 76 and ring 62 on the other side defines an inner branch 134 of the outer flow passage 68 in flow communication with an interior side 135 of the annular ring 62. Additionally, the annular ring 62 is spaced radially inwardly at an exterior side 136 thereof from the inner duct 34 so as to define an outer branch 138 of the outer flow passage 68 in flow communication with its exterior side.

The orifice means 52 of the shutdown system 28 alters the flow communication path exiting the latching mechanism 50 from within the inner duct 34 to within the annular space 40 between the outer and inner ducts 32,34. The orifice means is in the form of a plurality of flow openings 52 through the inner duct 34 at a location above the uppermost one of the absorber bundles 42 which establish the flow communication between the inner duct 34 and the annular space 40.

Lastly, the pumping means 54 of the shutdown system 28 is disposed adjacent the bottom nozzle 36 of the reactivity control assembly 16 and in flow communication with an inlet 140 thereof. In such position, the pumping means 54 is operable to receive pressurized primary coolant flowing upwardly through the bottom nozzle inlet 140 and, in turn, create an upward driving flow of the primary coolant through the absorber bundles 42 and then through the inner flow channel 58 of the top nozzle 38 via the inner flow passage 66 of the latching mechanism 50.

In addition, the pumping means 54 establishes flow communication between the bottom nozzle inlet 140 and the annular space 40 at the lower end of the inner duct 34 such that the upward driving flow of primary coolant, in turn, creates a suction head within the flow communication path extending through the annular space 40 all the way up to the outer flow channel 56 of the top nozzle 38 via (both branches 134,138 of) the outer flow passage 68 through the latching mechanism 50. The suction head so created causes an auxiliary downward flow of at least a portion of the heated coolant, as represented by the arrows 142 in FIG. 2, exiting from the respective upper ends 144 of the adjacent fuel assemblies 14, through the outer flow channel 56 to the pumping means 54 via the outer flow passage 68 of the latching mechanism 50, the openings 52 through the inner duct 34 above the absorber bundles 42 and the annular space 40 between the ducts 32,34. As the portion of the heated coolant exiting from the adjacent fuel assemblies 14 passes through the inner and outer branches 134,138 of the outer flow passage 68 through the latching mechanism 50, its temperature can be sensed directly by the annular ring 62 of temperature sensitive magnetic material composing a part of the armature 76 of the latching mechanism 50. Therefore, if because of some abnormal operating event the temperature of the heated coolant from the fuel assemblies 14 should rise above the preselected temperature of the material of the ring 62 at which its magnetic holding capacity is reduced, the magnetic flux path 118 will be broken and the holding capacity of the shutdown system 28 will be released, dropping the absorber bundles 42, and the extension sleeve 64, the lower socket 70, the armature 76, and the annular ring 62 therewith, by the force of gravity toward and into the core region 20. The upper socket 72 remains attached to the driveline shaft 46.

More particularly, the pumping means 54 includes a lower jet induction pump nozzle 146, an upper jet pump diffuser 148 and a plurality of passageways 150 defined through the bottom nozzle 36 between the lower pump nozzle 146 and the upper pump diffuser 148 so as to extend radially from the bottom nozzle inlet 140 to the annular space 40 at the lower end of the inner duct 34. The lower pump nozzle 146 is attached to the bottom nozzle 36 in flow communication with its inlet 140 and the interior of the inner duct 34 and has an upwardly converging orifice 152 for receiving primary coolant flow from the bottom nozzle inlet 140 and creating the upward driving flow of the primary coolant toward the pump diffuser 148. The pump diffuser 148 is attached to the bottom nozzle 36 and disposed in spaced relation above the pump nozzle 146. The pump diffuser 148 has an upwardly diverging orifice 154 for receiving the upward driving flow of primary coolant from the pump nozzle 146 to distribute the flow uniformly to the lowermost one of the absorber bundles 42. The upward driving flow of primary coolant from the pump nozzle 146 past the passageways 150 creates a venturi effect and thereby the aforementioned suction head in the outer flow channel 56 of the top nozzle 38 via the outer flow passage 68 of the latching mechanism 50 and the annular space 40 between the ducts 32,34. The portion of the heated coolant from the adjacent fuel assemblies 14 which flows downward because of the suction head is combined with the primary coolant flowing upward through the diffuser 148 and is so small in comparison with the quantity of cooler primary coolant that it has no detrimental effect on the temperature of the primary coolant.

Also, a dashpot piston 156 is attached by a short cylindrical sleeve 158 to the lowermost one of the absorber bundles 42 and the space between the inner duct 34 and the pump diffuser 148 provides a dashpot annulus 160. The dashpot piston 156 and annulus 160 coact together as a shock absorber when the absorber bundles 42 are released and drop into the core region 20 to cushion the end of their fall.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemlplary embodiment thereof.

We claim:

1. In a nuclear reactor including at least one fuel assembly having an upper end from which exits coolant after flowing upwardly through and being heated within said fuel assembly and at least one reactivity control assembly disposed adjacent said fuel assembly and having a bottom nozzle with an inlet, a top nozzle with an outlet, radially spaced outer and inner elongated ducts extending between and mounted at respective upper and lower ends to said nozzles, at least one neutron absorber bundle disposed in said inner duct for movement between raised and lowered positions axially along said inner duct and a driveline for moving said absorber bundle, said ducts defining an annular space extending between said nozzles, said top nozzle outlet being disposed adjacent said upper end of said fuel assembly, a self-actuated shutdown system incorporated in said reactivity control assembly which comprises:

(a) a tubular member extending through said outlet of said top nozzle so as to define an outer annular flow channel through said top nozzle outlet between said member and said top nozzle;

(b) a latching mechanism disposed between said driveline and said absorber bundle and including mating means and sensing means, said mating means being matable for interconnecting said driveline and said bundle together to hold said bundle in said raised position and unmatable for releasing said bundle from said driveline to drop said bundle to said lowered position, said mating means also defining an outer flow passage extending between and in flow communication with said inner duct and said outer flow channel of said top nozzle, said sensing means being sensitive to temperature and cooperable with said mating means for causing mating thereof when the temperature sensed is below a known temperature and unmating thereof when the temperature sensed is above a given temperature, said sensing means being positioned in communication with said outer flow passage of said mating means;

(c) orifice means defining at least one flow opening through said inner duct above said absorber bundle so as to establish flow communication between said inner duct and said annular space between said inner and outer ducts; and (d) pumping means disposed adjacent said bottom nozzle and in flow communication with said inlet thereof and said inner duct below said absorber bundle, said pumping means being operable to receive primary coolant flow from said bottom nozzle inlet and create an upward driving flow of said primary coolant through said absorber bundle, said pumping means establishing flow communication between said absorber bundle and said annular space at said inner duct lower end such that said upward driving flow of primary coolant, in turn, creates a suction head within said outer flow channel of said top nozzle and thereby an auxiliary downward flow of a portion of the heated coolant exiting from said upper end of said adjacent fuel assembly through said outer flow channel to said pumping means via said outer flow passage of said latching mechanism, said opening of said orifice means through said inner duct and said annular space between said ducts such that the temperature of said heated coolant exiting from said upper end of said adjacent fuel assembly can be sensed directly by said temperature sensitive sensing means of said latching mechanism.

2. The self-actuated shutdown system as recited in claim 1, wherein said mating means of said latching mechanism includes:

a lower cylindrical socket interconnected to said absorber bundle and having an upwardly-facing central mating surface and a peripheral edge;

an upper socket interconnected to said driveline and including a peripheral ledge having a downwardly-facing outer annular mating surface and a downwardly-extending central cylindrical body portion having a downwardly-facing central mating surface;

an annular-shaped electromagnetic coil mounted about said central body portion of said upper socket; and an annular-shaped armature connected to and extending upwardly from said peripheral edge of said lower socket and radially spaced outwardly from said coil, said armature having an upwardly-facing annular mating surface, whereby when said mating means is mated together said central mating surfaces of said upper and lower sockets contact one another and said annular mating surfaces of said upper socket and armature contact one another.

3. The self-actuated shutdown system as recited in claim 2, wherein:

said armature of said mating means includes upper and lower annular portions; and said sensing means of said latching mechanism is in the form of an annular ring of temperature sensitive magnetic material being mounted between and interconnecting said upper and lower portions of said armature.

4. The self-actuated shutdown system as recited in claim 3, wherein:

said mating means further includes a cylindrical insulating sleeve disposed within said armature;

said upper and lower annular portions of said armature having upper and lower inwardly-directed ledges connected to said insulating sleeve and respective orifices defined therethrough between said respective ledges and said annular ring of temperature sensitive magnetic material so as to define an inner branch of said outer flow passage in flow communication with an interior side of said annular ring of temperature sensitive magnetic material; and said annular ring of temperature sensitive magnetic material being spaced radially inwardly at an exterior side thereof from said inner duct so as to define an outer branch of said outer flow passage in flow communication with said exterior side.

5. The self-actuated shutdown system as recited in claim 1, wherein said pumping means includes a jet pump nozzle attached to said bottom nozzle in flow communication with said inlet thereof and said inner duct and having an upwardly converging orifice for receiving primary coolant flow from said bottom nozzle inlet and creating an upward driving flow of said primary coolant.

6. The self-actuated shutdown system as recited in claim 5, wherein said pumping means includes a jet pump diffuser attached to said bottom nozzle and disposed in spaced relation above said jet pump nozzle, said pump diffuser having an upwardly diverging orifice for receiving said upward driving flow of said primary coolant from said pump nozzle and distributing said flow to said absorber bundle.

7. The self-actuated shutdown system as recited in claim 6, wherein said pumping means includes at least one passageway defined through said bottom nozzle between said lower jet pump nozzle and said upper jet pump diffuser so as to provide flow communication from said annular space between said outer and inner ducts to said bottom nozzle inlet such that said upwardly driving flow of said primary coolant from said pump nozzle creates said suction head in said outer flow channel of said top nozzle via said outer flow passage of said latching mechanism and said annular space.

8. The self-actuated shutdown system as recited in claim 7, wherein said passageway extends radially from said bottom nozzle inlet to said annular space at said lower end of said inner duct.

9. In a nuclear reactor including at least one fuel assembly having an upper end from which exits coolant after flowing upwardly through and being heated within said fuel assembly and at least one reactivity control assembly disposed adjacent said fuel assembly and having a bottom nozzle with an inlet, a top nozzle with an outlet, radially spaced outer and inner elongated ducts extending between and mounted at respective upper and lower ends to said nozzles, at least one neutron absorber bundle disposed in said inner duct for movement between raised and lowered positions axially along said inner duct and a driveline for moving said absorber bundle, said ducts defining an annular space extending between said nozzles, said top nozzle outlet being disposed adjacent said upper end of said fuel assembly, a self-actuated shutdown system incorporated in said reactivity control assembly which comprises:

(a) a hollow tubular member having an exterior and an interior and extending through said outlet of said top nozzle so as to define an outer annular flow channel extending through said top nozzle outlet between said exterior of said hollow member and said top nozzle and an inner flow channel separate from said outer flow channel and extending through said top nozzle but within said hollow member interior;

(b) a latching mechanism disposed in said inner duct adjacent said upper end thereof and between said driveline and said absorber bundle, said latching mechanism including mating means and sensing means, said mating means being matable for interconnecting said driveline and said absorber bundle together to hold said bundle in said raised position and unmatable for releasing said bundle from said driveline to drop said bundle to said lowered position, said mating means also defining an inner flow passage extending between and in flow communication with said absorber bundle and said inner flow channel of said top nozzle and an outer flow passage separate from said inner flow passage and extending between and in flow communication with said inner duct and said outer flow channel of said top nozzle, said sensing means being sensitive to temperature and cooperable with said mating means for causing mating thereof when the temperature sensed is below a known temperature and unmating thereof when the temperature sensed is above a given temperature, said sensing means being positioned in communication with said outer flow passage of said mating means;

(c) orifice means defining a plurality of flow openings through said inner duct above said absorber bundle so as to establish flow communication between said inner duct and said annular space between said inner and outer ducts; and (d) pumping means disposed adjacent said bottom nozzle and in flow communication with said inlet thereof, said pumping means being operable to receive primary coolant flow from said bottom nozzle inlet and create an upward driving flow of said primary coolant through said absorber bundle to said inner flow channel of said top nozzle via said inner flow passage of said latching mechanism, said pumping means establishing flow communication between said absorber bundle and said annular space at said inner duct lower end such that said upward driving flow of primary coolant, in turn, creates a suction head within said outer flow channel of said top nozzle and thereby an auxiliary downward flow of a portion of the heated coolant exiting from said upper end of said adjacent fuel assembly through said outer flow channel to said pumping means via said outer flow passage of said latching mechanism, said opening of said orifice means through said inner duct and said annular space between said ducts such that the temperature of said heated coolant exiting from said upper end of said adjacent fuel assembly can be sensed directly by said temperature sensitive sensing means of said latching mechanism.

10. The self-actuated shutdown system as recited in claim 9, wherein said mating means of said latching mechanism includes:

a lower socket composed of an annular side wall interconnected to said absorber bundle and an upper end wall merging from said side wall and having an upwardly-facing central mating surface, a outer peripheral edge and a plurality of openings defined through said end wall between said mating surface and said outer edge which provide flow communication between said absorber bundle and said inner flow passage through said latching mechanism;

an upper socket composed of a upper cylindrical head interconnected to said driveline and a central cylindrical body attached to and extending downwardly from said head, said body having a smaller diameter than said upper head so as to define a peripheral ledge on said upper head extending radially outward from said body and having a downwardly-facing outer annular mating surface formed thereon, said head having a plurality of holes defined therethrough between said mating surface and central body which provide flow communication between said inner flow channel of said top nozzle within said tubular member interior and said inner flow passage through said latching mechanism, said body at a lower end having a downwardly-facing central mating surface formed thereon;

an annular-shaped electromagnetic coil mounted about said central body of said upper socket; and an annular-shaped armature connected to and extending upwardly from said peripheral edge of said lower socket and radially spaced outwardly from said central body of said upper socket and said coil thereon so as to define an annular region of said inner flow passage communicating with said openings in said lower socket upper end wall and said holes in said upper socket head, said armature having an upwardly-facing annular mating surface, whereby when said mating means is mated together said central mating surfaces of said upper and lower sockets contact one another and said annular mating surfaces of said upper socket and armature contact one another.

11. The self-actuate shutdown system as recitd in claim 10, wherein:
said armature of said mating means includes upper and lower annular portions; and
said sensing means of said latching mechanism is in the form of an annular ring of temperature sensitive magnetic material being mounted between and interconnecting said upper and lower portions of said armature.

12. The self-actuated shutdown system as recited in claim 11, wherein:
said mating means further includes a cylindrical insulating sleeve disposed within said armature;
said upper and lower annular portions of said armature having upper and lower inwardly-directed ledges connected to said insulating sleeve and respective orifices defined therethrough between said respective ledges and said annular ring of temperature sensitive magnetic material so as to define an inner branch of said outer flow passage in flow communication with an interior side of said annular ring of temperature sensitive magnetic material; and
said annular ring of temperature sensitive magnetic material being spaced radially inwardly at an exterior side thereof from said inner duct so as to define an outer branch of said outer flow passage in flow communication with said exterior side.

13. The self-actuated shutdown system as recited in claim 9, wherein said pumping means includes a jet pump nozzle attached to said bottom nozzle in flow communication with said inlet thereof and said inner duct and having an upwardly converging orifice for receiving primary coolant flow from said bottom nozzle inlet and creating an upward driving flow of said primary coolant.

14. The self-actuated shutdown system as recited in claim 13, wherein said pumping means includes a jet pump diffuser attached to said bottom nozzle and disposed in spaced relation above said jet pump nozzle, said pump diffuser having an upwardly diverging orifice for receiving said upward driving flow of said primary coolant from said pump nozzle and distributing said flow to said absorber bundle.

15. The self-actuated shutdown system as recited in claim 14, wherein said pumping means includes a plurality of passageways defined through said bottom nozzle between said lower jet pump nozzle and said upper jet pump diffuser so as to provide flow communication from said annular space between said outer and inner ducts to said bottom nozzle inlet such that said upwardly driving flow of said primary coolant from said pump nozzle creates said suction head in said outer flow channel of said top nozzle via said outer flow passage of said latching mechanism and said annular space.

16. The self-actuated shutdown system as recited in claim 15, wherein said passageways extend radially from said bottom nozzle inlet to said annular space at said lower end of said inner duct.

* * * * *